(12) United States Patent
Eitzmann

(10) Patent No.: US 6,377,270 B1
(45) Date of Patent: Apr. 23, 2002

(54) METHOD AND SYSTEM FOR TRANSFORMING COLOR COORDINATES BY DIRECT CALCULATION

(75) Inventor: Gregory Eitzmann, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/363,636

(22) Filed: Jul. 30, 1999

(51) Int. Cl.[7] .................................................. G09G 5/00
(52) U.S. Cl. ........................................ 345/589; 345/418
(58) Field of Search ................................ 345/150, 152, 345/153, 147, 154; 348/675

(56) References Cited

U.S. PATENT DOCUMENTS

| | | | | |
|---|---|---|---|---|
| 5,461,706 A | * | 10/1995 | Trow et al. ................... | 395/125 |
| 5,546,101 A | * | 8/1996 | Sugawara ..................... | 345/63 |
| 5,754,150 A | * | 5/1998 | Matsui ......................... | 345/89 |
| 5,870,076 A | * | 2/1999 | Lee et al. .................... | 345/149 |
| 5,910,796 A | * | 6/1999 | Gormish ...................... | 345/153 |
| 6,201,530 B1 | * | 3/2001 | Thadani et al. ............. | 345/150 |

OTHER PUBLICATIONS

James D. Foley et al., Computer Graphics Principles and Practice 564–567 (2nd ed., Addison–Wesley Publishing 1990).

Adrian Nye, The Definifitive Guides to the X Window System, vol. 1: Xlib Programming Manual 173–180 (for version 11, O'Reilly & Associates 1988).

Charles A. Poynton, A Technical Introduction to Digital Video, 107–109 (John Wiley & Sons 1996).

David F. Rogers and J. Alan Adams, Mathematical Elements for Computer Graphics (2nd ed., McGraw–Hill 1990).

* cited by examiner

Primary Examiner—Bipin Shalwala
Assistant Examiner—Nitin Patel
(74) Attorney, Agent, or Firm—Woodcock Washburn LLP

(57) ABSTRACT

A system and method of gamma correction of pixel color coordinates by direct calculation is provided. The response characteristics of a graphics display device are modeled to produce a set of transformation functions. The parameters that describe the transformation functions are then sent to a transformation unit. To display a pixel, the transformation unit evaluates the transformation functions. Color coordinates of the pixel are used as inputs in the evaluation of the transformation functions. This produces transformed pixel color coordinates. The transformed pixel color coordinates are then sent to the graphics display device. The pixel can then be displayed with its originally intended color.

6 Claims, 7 Drawing Sheets

200

| Color Coordinate Representation 202 | Voltage Input to Display 204 |
|---|---|
| $00_{hex}$ | $V_0$ |
| 01 | $V_1$ |
| 02 | $V_2$ |
| ⋮ | ⋮ |
| FF | $V_{255}$ |

METHOD AND SYSTEM FOR TRANSFORMING COLOR COORDINATES BY DIRECT CALCULATION

BACKGROUND OF THE INVENTION

1. Field of the Invention

The invention relates to computer graphics, and more particularly to the gamma correction of color coordinates.

2. Related Art

In the field of computer graphics the color display process must contend with the fact that display of a color's brightness is typically nonlinear, relative to an input of varying color coordinate values to a graphics display device. In a physical sense, color coordinate values are sent to a graphics display device in the form of electrical signals. Such an electrical signal (known hereinafter as an input signal) can, for example, be a digital signal representing a color coordinate value, or an analog signal having a particular voltage level that corresponds to a color coordinate value. If the relationship between the input signal and displayed brightness were linear, then it would be a straightforward problem to determine the proper color coordinate value to achieve a certain brightness. Because of the nonlinearity in the response of graphics display devices, it becomes difficult to determine the appropriate input signal. An exemplary graph illustrating the nonlinearity is shown in FIG. 1. The relationship between the value represented by input signal 104 and brightness 106 is shown as a nonlinear function 102, where brightness 106 varies from minimum brightness 108 to maximum brightness 110.

The solution to this problem is a process known as gamma correction. In a gamma correction process the voltage input to a graphics display is controlled so as to produce the intended color. The conventional approach to gamma correction involves a plurality of lookup tables.

Given a typical color representation having three distinct color coordinates, three lookup tables are required. If, for example, colors are being represented in a red/green/blue (RGB) color space, the color of any given pixel is represented by three coordinates, a red coordinate, a green coordinate, and a blue coordinate. In a conventional approach to gamma correction, there are three corresponding lookup tables, one lookup table for the red coordinate, one lookup table for the green coordinate, and one lookup table for the blue coordinate. A lookup table for a given color coordinate lists each possible value for the color coordinate. For each value of a color coordinate there is an associated input signal. The input signal is chosen so that when it is input to a graphics display device, the brightness indicated by the associated color coordinate is displayed accurately.

The lookup table process can be integrated into the output processing of a frame buffer as follows. A given pixel is read from the frame buffer. The red coordinate of the pixel is used to access the red lookup table. Likewise the green and blue color coordinates of that pixel are used to access the green and blue lookup tables respectively. As a result, for each pixel, three input signals are determined from these three lookup tables. The input signals are then sent to the graphics display device, which produces the intended color.

An example lookup table is illustrated in FIG. 2. Gamma correction lookup table 200 maps color coordinate values 202 to input signals. In this example, input signals are represented as voltage levels 204. The brightness indicated by a color coordinate is achieved by sending the corresponding voltage level to the graphics display device. For illustrative purposes, color coordinate values 202A through 202n are shown as 8-bit values, expressed in hexadecimal. Actual graphics systems may use longer or shorter color coordinate values. Voltage values are shown as 204A through 204n.

There are a number of shortcomings with this approach. First, the process of loading lookup tables into a frame buffer can be time consuming. As described above, three lookup tables are necessary. If each color coordinate is represented by eight bits, then each table must necessarily consist of 256 entries. It is not uncommon, however, for current computer graphics applications to represent color coordinates by as many as 24 bits. As a result, the lookup tables become sizable. The process of loading the lookup tables therefore becomes time consuming. Second, in light of the potentially large size of every lookup table, significant amounts of memory are necessary. The design of a frame buffer must therefore account for significant amounts of memory when a lookup table architecture is used.

A system and method of performing gamma correction is needed where lookup tables are not required. Such an alternative system and method must be practical to implement. It should not include a time consuming loading process, nor should it require significant amounts of memory.

SUMMARY OF THE INVENTION

The invention comprises a system and method of gamma correction of pixel color coordinates by direct calculation. The invention models the response characteristics of a graphics display device to produce a set of transformation functions. The parameters that describe the transformation functions are then sent to a transformation unit. To display a pixel, the transformation unit evaluates the transformation functions, using the color coordinates of the pixel as inputs. This produces transformed pixel color coordinates. The transformed pixel color coordinates are then sent to the graphics display device. The pixel can then be displayed with its originally intended color.

FEATURES AND ADVANTAGES

The invention described herein has the feature of performing gamma correction by direct calculation of transformation functions, instead of using lookup tables to obtain gamma-corrected color coordinates. The invention has the additional feature of being implemented in either hardware, software, or a combination thereof.

The invention has the advantage of requiring a short time to load necessary data. The time needed to load transformation function description parameters is less than the time required to load lookup tables, because transformation function description parameters represents less data than lookup tables. For this same reason, the invention has the further advantage of requiring less memory. While lookup tables require significant amounts of memory, the invention described herein requires memory only for a relatively small number of transformation function description parameters.

Further features and advantages of the invention as well as the operation of various embodiments of the present invention are described in detail below with reference to the accompanying drawings.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

FIG. 2 is an illustration of an example gamma correction lookup table.

DETAILED DESCRIPTION OF THE PREFERRED EMBODIMENTS

Contents
 I. Overview
 II. Terminology
 III. Apparatus
 IV. Process
 V. Other Applications
 VI. Environment
 VII. Conclusion I. Overview The invention provides a method and system for gamma corrections that would otherwise be performed by table lookup processes. Rather than using a table to transform a color coordinate, transformation functions are used to calculate new color coordinates directly. The apparatus of the invention uses a transformation unit that executes the transformation functions. The method of the invention includes mathematically modeling the response of a graphics display device to determine the transformation functions, loading the parameters of the transformation functions into the transformation unit, evaluating the transformation function using input color coordinate values, and outputting the resulting values to a graphics display device.

II. Terminology

The following section defines several terms that occur frequently throughout the application.

Curve fitting refers to a process where a physical phenomenon is modeled by a mathematical function or curve. Typically, a relationship between two quantities, such as color coordinate value and displayed brightness, is first modeled as a discrete set of points in a cartesian plane. A curve is constructed that includes, or fits, as many of these points as possible. The curve then serves as the final model of the relationship.

Gamma correction refers to the process of compensating the color coordinates of a pixel to account for nonlinearity in the response characteristics (see below) of a graphics display device. Gamma correction transforms the value of color coordinates so that the originally intended color is displayed accurately.

Response characteristics refer to the response of a graphics display device to variations in pixel color coordinate values. Pixel color coordinates, physically embodied as input signals to a display device, are not typically displayed with accuracy by such a device. The brightness of the display (that is, the response) generally varies in a nonlinear way over a range of input color coordinate values. The manner in which a graphics display device responds to variations in color coordinate values is known herein as the response characteristics of the device.

III. Apparatus

Figure 1:
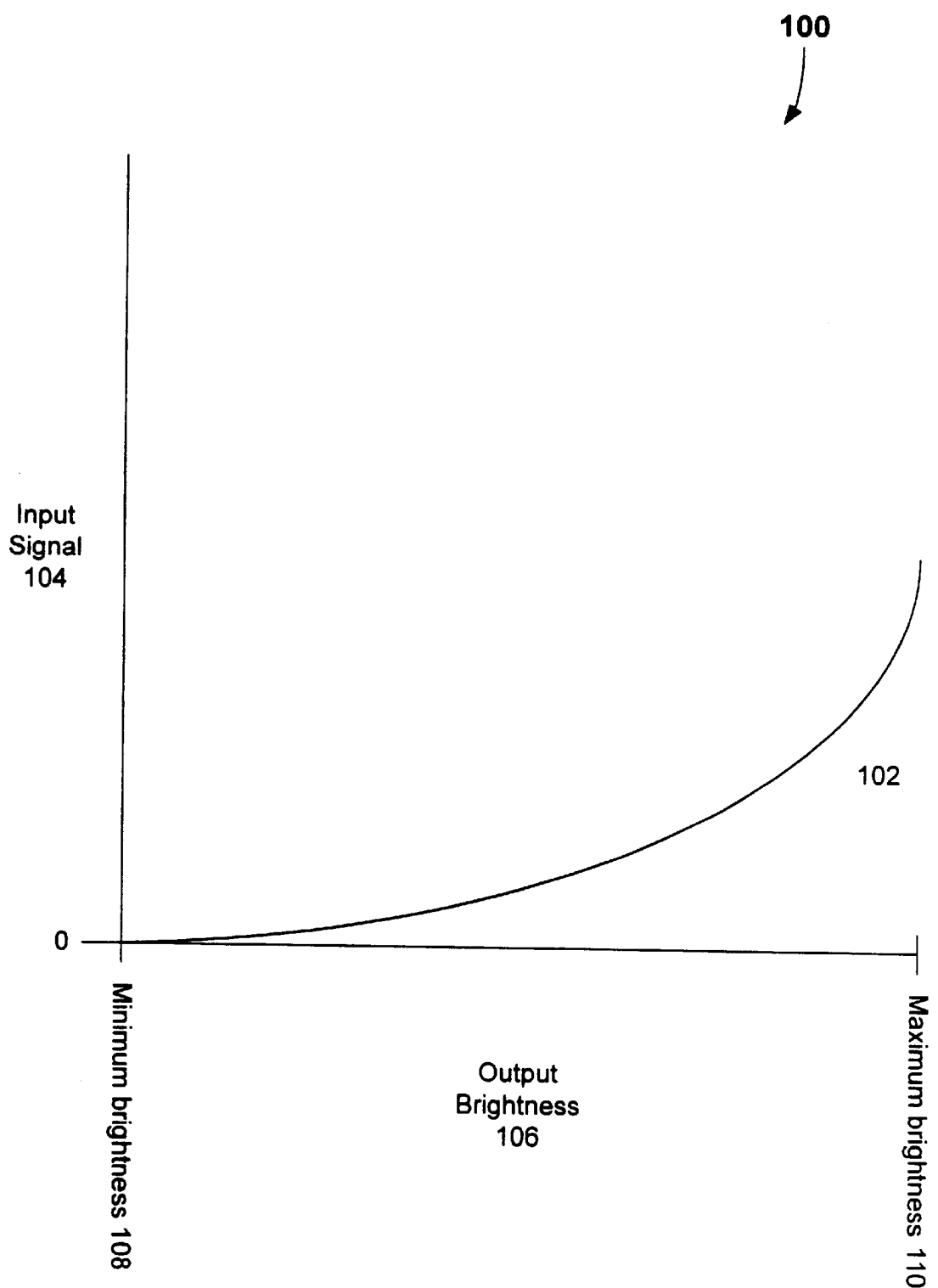
FIG. 1 illustrates the nonlinear relationship between the brightness displayed on a graphics display device and the value of an input signal.
Figure 3:
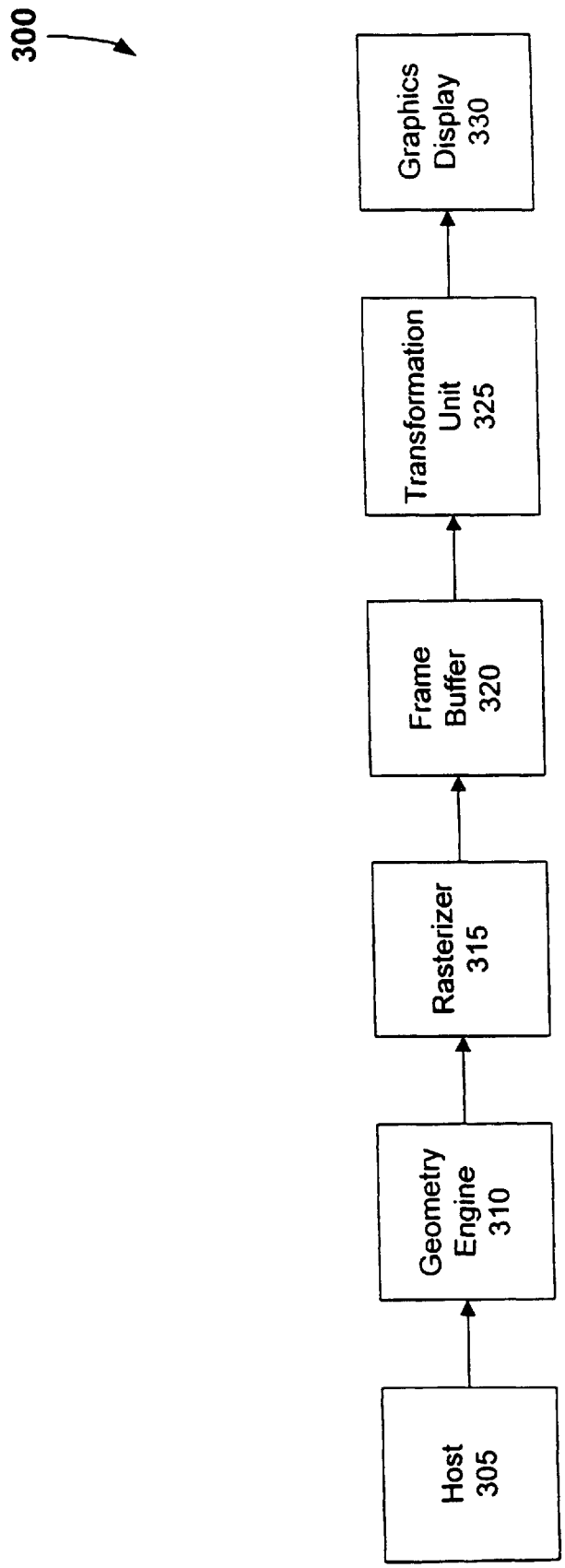
FIG. 3 is a block diagram showing a transformation unit in the context of a graphics processing system, according to an embodiment of the invention.

The apparatus of the present invention comprises a transformation unit that operates in the context of a graphics processing system. The transformation unit is responsible for executing a transformation function derived from the response characteristics of an graphics display device. One embodiment of the transformation unit, in the context of an example graphics system, is illustrated in FIG. 3. In such a system, a host 305 generates and sends graphics commands and graphics data (sometimes known as primitives) to a geometry engine 310. Geometric and color data produced by geometry engine 310 is then passed to a rasterizer 315. Rasterizer 315 stores the actual pixels (pixel data) resulting from the graphics process in frame buffer 320.

According to the present invention, pixel data is then sent to a transformation unit 325. Here each color coordinate of each pixel is transformed so as to compensate for the nonlinear response of a graphics display 330. Following the transformation, pixel data comprising the transformed color coordinates is then sent to graphics display 330. In general, transformation unit 325 can be implemented in hardware, software, firmware, or any combination thereof. In one preferred embodiment of the present invention, transformation unit 325 is a hardware device. The logic in transformation unit 325 may be fixed or, alternatively, may be programmable. Transformation unit 325 may, for example, be embodied using programmable gate array technology. The logic in transformation unit 325 may alternatively be embodied in software. Note also that graphics display 330 can be any type of display including, but not limited to, a cathode ray tube (CRT), a laser projector, or a liquid crystal display (LCD), or the like. Graphics display device 330 can also be a color printer.

Figure 4:
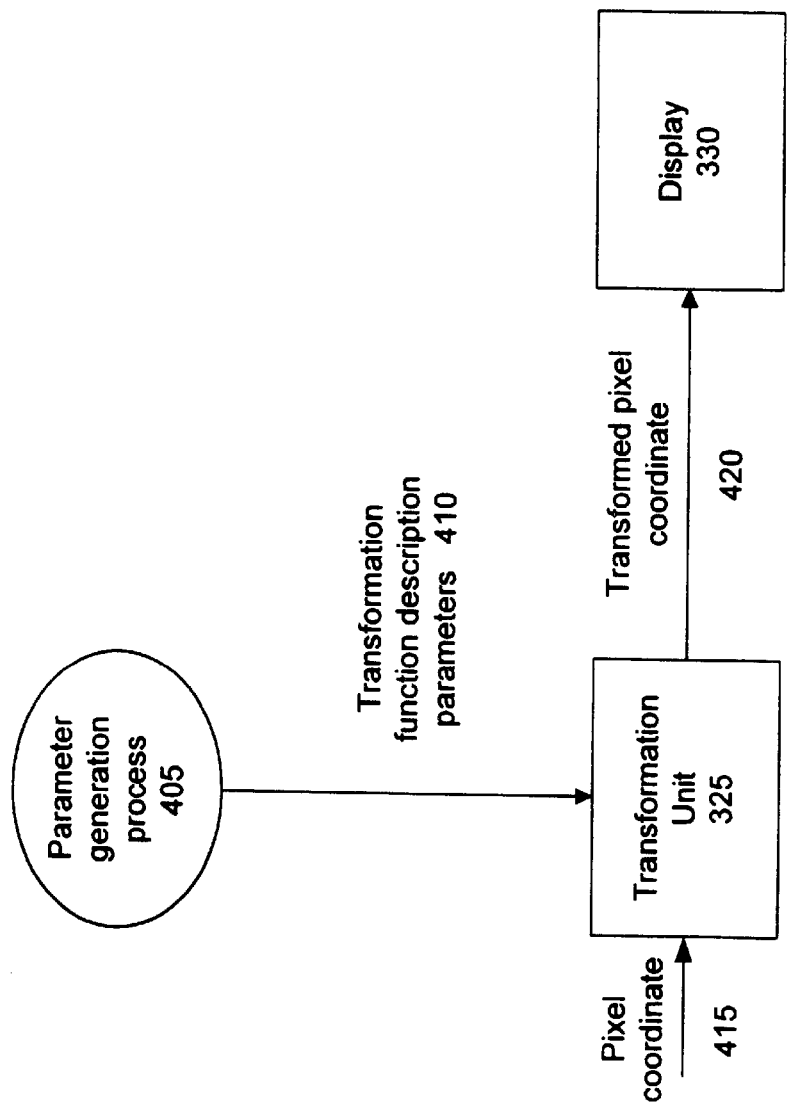
FIG. 4 is a block diagram showing the inputs and output of a transformation unit, according to an embodiment of the invention.

Interfaces to transformation unit 325, according to an embodiment of the invention, are illustrated in greater detail in FIG. 4. In this embodiment, a parameter generation process 405 serves to model the response of the graphics display device with respect to each color coordinate. Parameter generation process 405 may be implemented in hardware, software, or a combination thereof. Parameter generation process 405 comprises the step of mapping, for each color coordinate, the displayed brightness of that coordinate to the input signal (or, equivalently, the color coordinate value) necessary to generate that brightness. This yields a transformation function for each color coordinate. Therefore, in an RGB color space, three transformation functions will be produced, one for the red coordinate, one for the green coordinate, and one for the blue coordinate. Each transformation function, or curve, can be described by a set of transformation function description parameters 410. By producing a set of transformation functions, parameter generation process 405 therefore generates transformation function description parameters 410. The generation of function description parameters is well known to those skilled in the relevant art. One way in which function description parameters can be generated is through a curve fitting process.

Parameter generation process 405 then passes transformation function description parameters 410 to transformation unit 325 via a port on transformation unit 325. In an embodiment of the invention, transformation function description parameters 410 are stored in a memory medium internal to transformation unit 325. In an alternative embodiment of the invention (not shown), transformation function description parameters 410 can be stored in a memory medium external to transformation unit 325 and accessed as necessary by transformation unit 325.

In one embodiment of the invention, transformation unit 325 contains logic specific to a class of functions, such as polynomials. Transformation unit 325 can also be limited to a set of polynomials, such as fifth degree polynomials. In such an embodiment, transformation function description parameters 410 comprise coefficients that describe fifth degree polynomials. Bezier functions can also be used. In this case, transformation function description parameters 410 can comprise specifications for basis curves used to generate a Bezier function. These examples are not intended to limit the present invention. Any curve can be used, including, but not limited to, the curves described in *Mathematical Elements for Computer Graphics,* by David F. Rogers and J. Alan Adams, 2d edition, McGraw-Hill, 1990 (incorporated herein by reference).

Once transformation unit 325 has received transformation function description parameters 410, transformation unit 325 is equipped to execute the transformation functions determined by curve fitting process 405. A pixel coordinate 415 can then be input to transformation unit 325 via a port on the unit. Transformation unit 325 then evaluates the transformation function appropriate to pixel coordinate 415, at the value defined by pixel coordinate 415. If, for example, pixel coordinate 415 is the red coordinate of an RGB pixel, then transformation unit evaluates the transformation function that was derived from the response of graphics display device 330 to red pixel coordinates. This yields a transformed pixel coordinate 420. Transformed pixel coordinate 420 is then output to display 330 via an output port on transformation unit 325.

As noted above, in an embodiment of the invention, the transformation unit 325 is programmable. This enables the transformation unit to execute a variety of transformation functions. This would be necessary, for example, in a situation where the transformation unit must be adaptable to a variety of graphics display devices, each having its own response characteristics. In such a case, transformation function description parameters would need to be regenerated for every graphics display device having a different set of transformation functions.

IV. Process

The process of the present invention begins with the selection or determination of transformation functions. As described above, the transformation functions model the response characteristics of a graphics display device. The transformation function description parameters that describe the transformation functions are then sent to a transformation unit. This allows the transformation unit to execute the transformation functions on pixel coordinate values. This produces transformed pixel values that, when sent to the graphics display device, produce the desired brightness.

Figure 5:
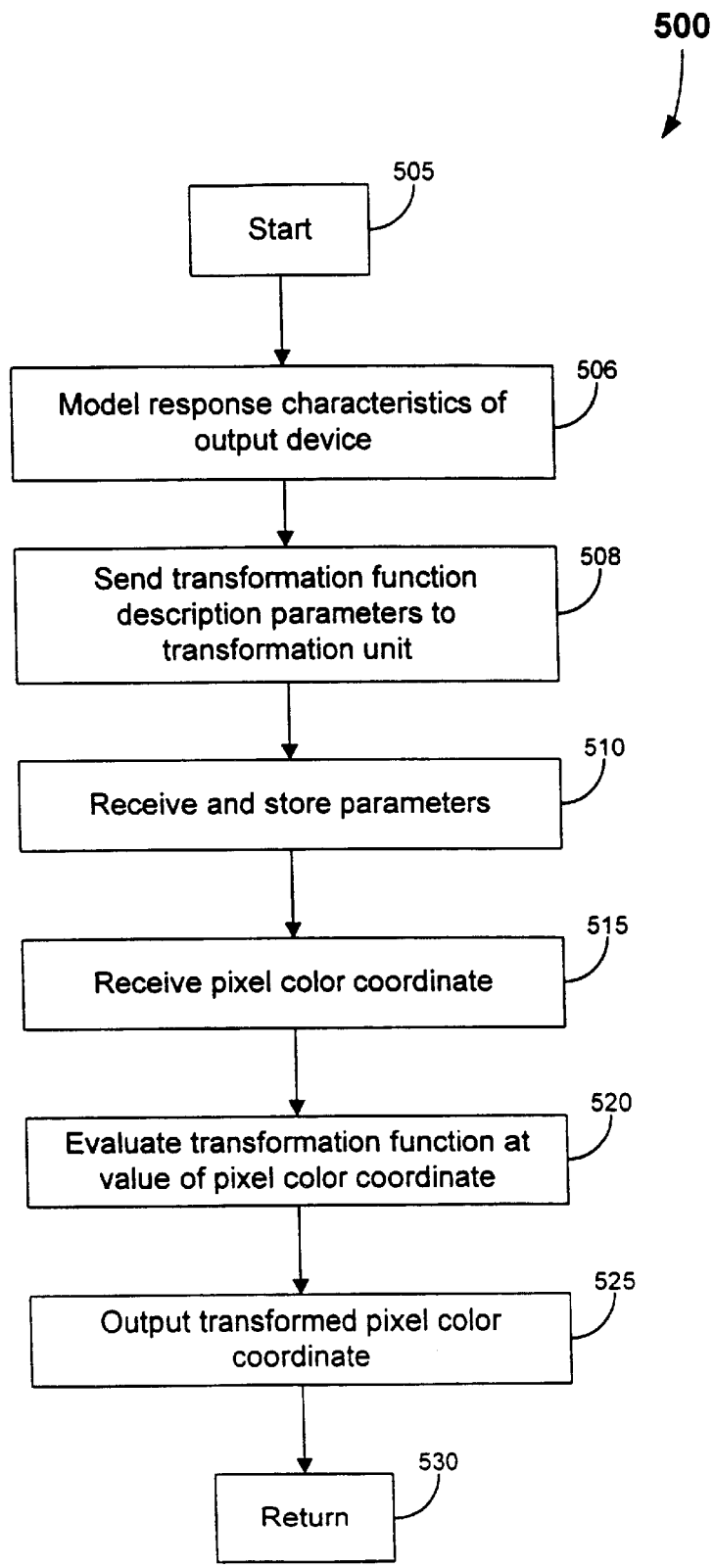
FIG. 5 is a flowchart illustrating the process of an embodiment of the invention.

The process of the present invention is illustrated in FIG. 5. The process begins at a step 505. In a step 506, the response characteristics of a graphics display device are modeled. In an embodiment of the invention, the modeling process comprises a curve fitting process. The model comprises transformation functions that describe the value represented by an input signal (or, equivalently, color coordinate value) as a function of displayed brightness. Note that the color of any given pixel is typically represented by a set of three color coordinates. If, for example, colors are being represented in an RGB color space, the color of a pixel will be represented by three corresponding color coordinates. Moreover, the response characteristics of a graphics display device may be different for different color components. In the case of the RGB color space, for example, a device's response (and therefore its transformation function) for the red component may be different from that of the green component. As a result, step 506 comprises the modeling of a plurality of responses, one for each color coordinate. In the case of the RGB color space, for example, step 506 results in the development of three transformation functions.

Each transformation function is described unambiguously in terms of transformation function description parameters. In a step 508, the response modeling process sends the transformation function description parameters of each transformation function to a transformation unit. In a step 510, the transformation unit receives and stores the transformation function description parameters. This step enables the transformation unit to execute the transformation functions.

In a step 515 a pixel color coordinate is entered into the transformation unit. After a pixel color coordinate has been entered in the transformation unit, in a step 520, the transformation unit uses the transformation function to transform the value of the pixel color coordinate. This produces a transformed pixel color coordinate. In a step 525 the transformed pixel color coordinate is output to a graphics display device, along with the other coordinates of the pixel. The process terminates with a step 530. During the generation of an image, steps 515 through 525 must be repeated for each color coordinate of each pixel of the image. In this manner, an image is created and sent to a graphics display device wherein the colors of the image have been compensated so that they are correctly displayed on the graphics display device.

Figure 6:
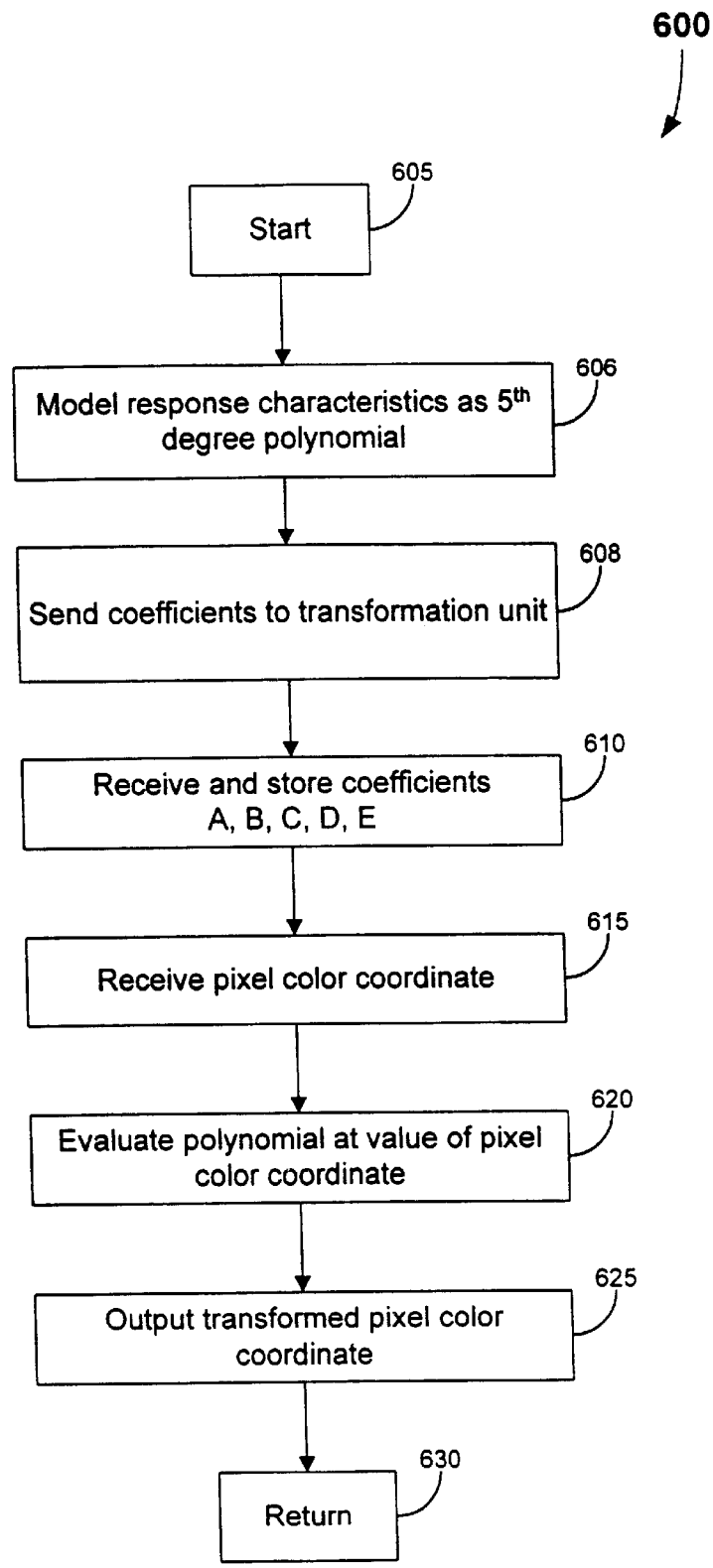
FIG. 6 is a flowchart illustrating the processing of transformation function parameters when the transformation is a fifth degree polynomial, according to an embodiment of the invention.

In an embodiment of the invention, the response characteristics of a graphics display device are modeled as a transformation function that is a fifth degree polynomial. The process of such an embodiment is illustrated in FIG. 6. The process begins with a step 605. In a step 606, a curve fitting process models the response characteristics of an graphics display device as a fifth degree polynomial. In a step 608, the curve fitting process sends the transformation function description parameters of each transformation function to a transformation unit. In this case, the transformation function description parameters are the coefficients of the fifth degree polynomial resulting from the modeling process of step 606. Given a fifth degree polynomial, five coefficients necessarily represent such a polynomial. These coefficients are described in FIG. 6 as coefficients A, B, C, D, and E. In a step 610 the transformation unit receives and stores the coefficients associated with the polynomial. In a step 615 the transformation unit receives a pixel color coordinate. In a step 620 the polynomial is applied to the value of the pixel color coordinate, generating a transformed pixel color coordinate. In a step 625, the transformed pixel color coordinate is output to a graphics display device. The process concludes with a step 630.

Note that in an embodiment of the invention a transformation unit may be programmable. This would enable the transformation unit to execute a variety of transformation functions. This would be necessary, for example, in a situation where the transformation unit must be adaptable to a variety of graphics display devices, each having its own response characteristics. In such a case, transformation function description parameters would need to be regenerated for every graphics display device having a different set of transformation functions.

V. Other Applications

Note that the present invention may be used in situations where the transformation function does not correspond to the graphics display device attached to the graphics system. It may be desirable, for instance, for the graphics display device to mimic some other output medium. A user may wish to use a CRT to mimic the response of a medium such as film, for example. In this case, the response characteristics of both display media must be considered. Two transformation functions must therefore be derived, one corresponding to film and another corresponding to the CRT. In such a case, the transformation unit must apply both transformation functions to pixel color coordinates in order to produce the necessary transformed color coordinates.

VI. Environment

Figure 7:
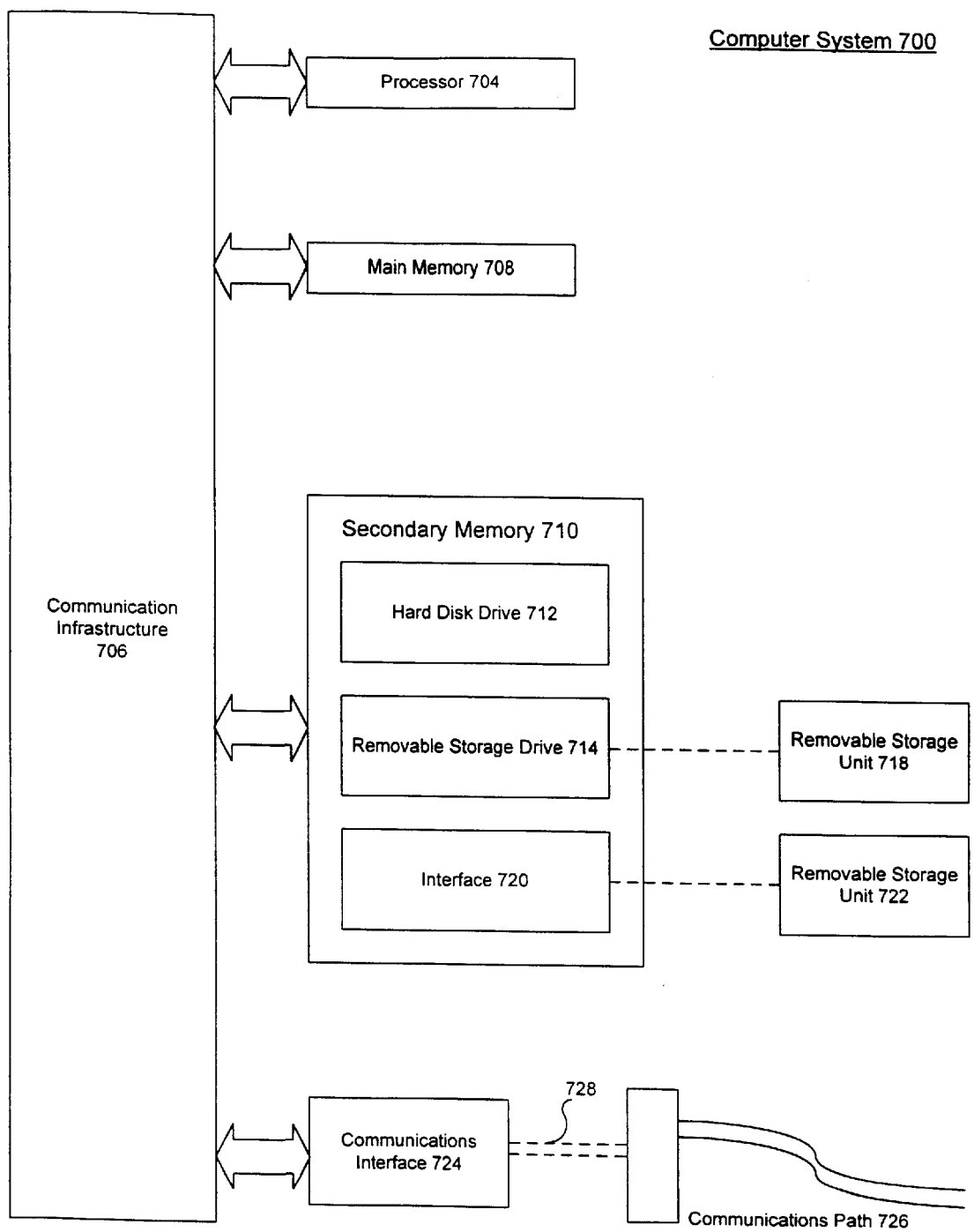
FIG. 7 is a block diagram illustrating a computer system embodiment of a transformation unit, according to an embodiment of the invention.

The transformation unit of the present invention may be implemented using hardware, software or a combination thereof and may be implemented as a computer system or other processing system. An example of such a computer system 700 is shown in FIG. 7. The computer system 700 includes one or more processors, such as processor 704. The processor 704 is connected to a communication infrastructure 706 (e.g., a bus or network). Various software implementations are described in terms of this exemplary computer system. After reading this description, it will become apparent to a person skilled in the relevant art how to implement the invention using other computer systems and/or computer architectures.

Computer system 700 also includes a main memory 708, preferably random access memory (RAM), and may also include a secondary memory 710. The secondary memory 710 may include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well known manner. Removable storage unit 718, represents a floppy disk, magnetic tape, optical disk, etc. which is read by and written to by removable storage drive 714. As will be appreciated, the removable storage unit 718 includes a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a PCMCIA slot and card, etc. Software and data transferred via communications interface 724 are in the form of signals 728 which may be electronic, electromagnetic, optical or other signals capable of being received by communications interface 724. These signals 728 are provided to communications interface 724 via a communications path (i.e., channel) 726. Channel 726 carries signals 728 and may be implemented using wire or cable, fiber optics, a phone line, a cellular phone link, an RF link and other communications channels. Channel 728 represents a communications path over which transformation function description parameters and pixel coordinates may be entered to a transformation unit implemented in a computer system 700.

In this document, the terms "computer program medium" and "computer usable medium" are used to generally refer to media such as removable storage drive 714, a hard disk installed in hard disk drive 712, and signals 728. These computer program products are means for providing software to computer system 700.

Computer programs (also called computer control logic) are stored in main memory 708 and/or secondary memory 710. Computer programs may also be received via communications interface 724. Such computer programs, when executed, enable the computer system 700 to implement the present invention as discussed herein. In particular, the computer programs, when executed, enable the processor 704 to implement the present invention. Accordingly, such computer programs represent controllers of the computer system 700. Where the invention is implemented using software, the software may be stored in a computer program product and loaded into computer system 700 using removable storage drive 714, hard drive 712 or communications interface 724.

VII. Conclusion

While various embodiments of the present invention have been described above, it should be understood that they have been presented by way of example, and not limitation. It will be apparent to persons skilled in the relevant art that various changes in detail can be made therein without departing from the spirit and scope of the invention. Thus the present invention should not be limited by any of the above-described exemplary embodiments, but should be defined only in accordance with the following claims and their equivalents.

What is claimed is:

1. A method of performing gamma correction of pixel color coordinates, comprising the steps of:
   (a) determining the transformation function that matches the response function of a graphics display device;
   (b) sending transformation function description parameters of the transformation function to a transformation unit;
   (c) receiving, at said transformation unit, transformation function description parameters that define a transformation function;
   (d) storing the transformation function description parameters that define the transformation function;
   (e) receiving a pixel color coordinate;
   (f) evaluating the transformation function at the received pixel color coordinate, to perform gamma correction directly and produce a transformed pixel color coordinate; and
   (g) outputting the transformed pixel color coordinate.

2. The method of claim 1, wherein the transformation function comprises a polynomial and the transformation function description parameters comprise a plurality of coefficients associated with the polynomial;
   step (a) comprises determining the polynomial that matches the response function of the graphics display device; and step (b) comprises sending coefficients associated with the polynomial to the transformation unit.

3. The method of claim 2, wherein the polynomial comprises a fifth degree polynomial;
   step (a) comprises determining the fifth degree polynomial that matches the response function of the graphics display device; and
   step (b) comprises sending coefficients associated with the fifth degree polynomial to the transformation unit.

4. The method of claim 1, wherein the transformation function comprises a Bezier function; and
   step (a) comprises determining the Bezier function that matches the response function of the graphics display device.

5. The method of claim 1, wherein step (a) comprises a curve fitting process.

6. A system for performing gamma correction of a pixel color coordinate, the system comprising:
   a transformation unit, wherein said transformation unit evaluates a transformation function at a pixel color coordinate value to obtain a transformed pixel color coordinate that can be output for display in a gamma corrected pixel, said system comprising:
   transformation function determining means for determining the transformation function evaluated in said transformation unit and that represents response characteristics of a graphics display device; and
   parameter generating means for generating transformation function description parameters that define said transformation function.

* * * * *